United States Patent Office 3,445,625
Patented May 20, 1969

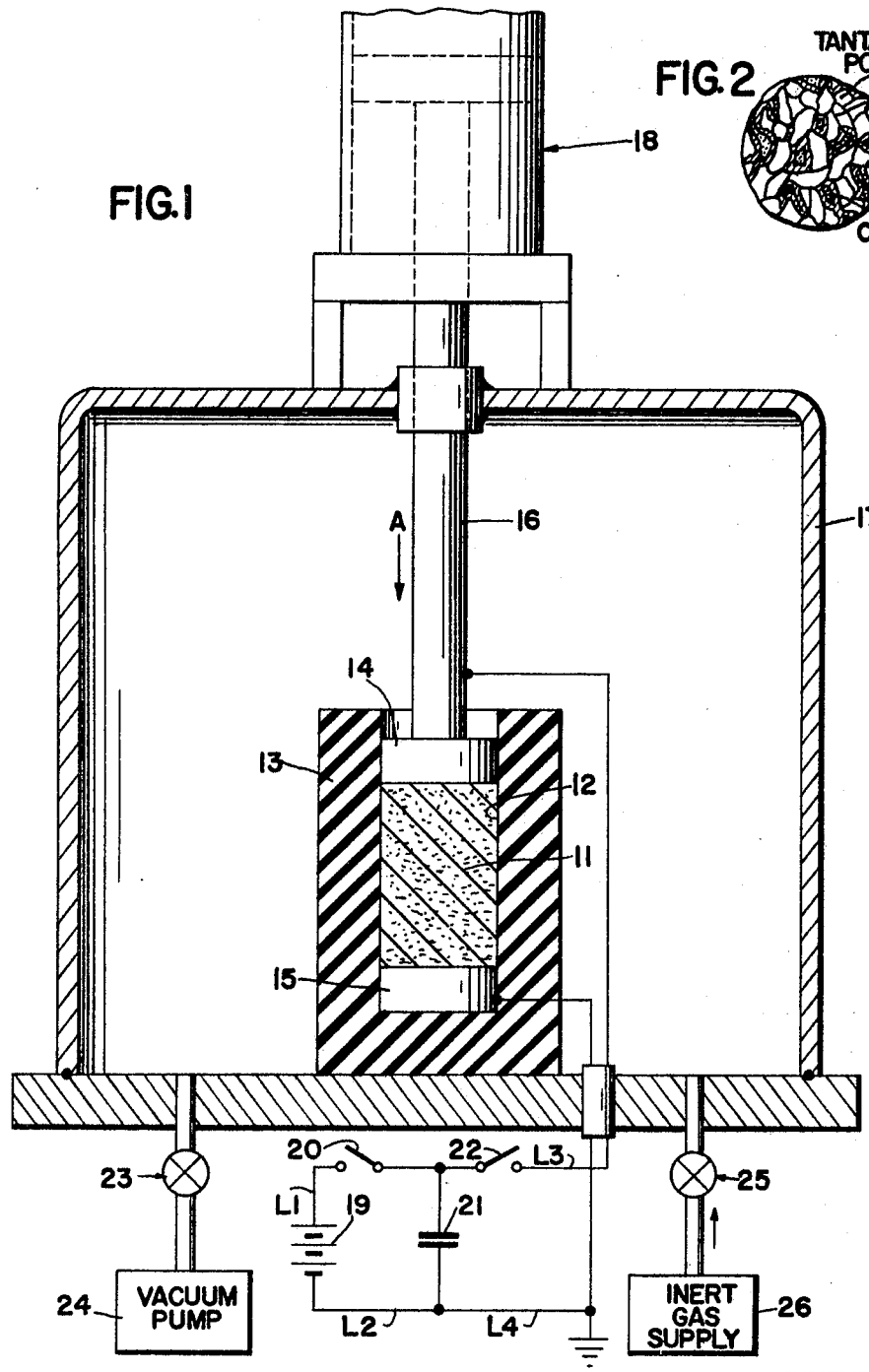
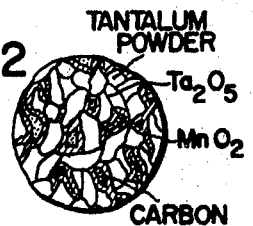

3,445,625
METHOD FOR MAKING POROUS LOW DENSITY METAL MEMBER FROM POWDERED METAL
James S. Hetherington, Menlo Park, Calif., assignor to Varian Associates, Palo Alto, Calif., a corporation of California
Filed Sept. 3, 1964, Ser. No. 394,114
Int. Cl. H05b 7/00; B21j 1/00; B22f 9/00
U.S. Cl. 219—149                    2 Claims

ABSTRACT OF THE DISCLOSURE

A method and apparatus for making the porous tantalum body member of a tantalum capacitor. Tantalum powder is moderately compressed at a pressure of approximately 18,000 p.s.i. in a mold to create a low density mass. A high voltage capacitor bank is then discharged through the tantalum powder to lightly weld the particles together without producing a substantial further density increase. The porous body member is then sintered in a vacuum furnace to improve mechanical strength.

---

This invention relates generally to porous metal members, and particularly to a method for preparing porous metal members, to apparatus for preparing porous metal members, and to articles of manufacture in which said porous metal members may be used. While not limited thereto, the invention may be advantageously employed in the fabrication of capacitors, for example, tantalum capacitors.

Capacitors have been made, heretofore, in which the body of the capacitor comprises a porous metal member or plug. After a pre-sintering and a sintering operation the walls of the pores are covered or coated by a dielectric layer, for example, by electrolytic oxidation. In the case of an electrolytic capacitor the pores of the plug are filled with a high conductivity, liquid electrolyte, and sealed in a small can. Or in the case of a solid capacitor, the operational electrolyte is replaced by a high conductivity solid material, impregnated with a conductive coating and enclosed in a metal can. The metal of the porous plug is connected with one and the conductive substance filling the pores with another terminal, whereby an electrical capacitor is obtained, the porous plug of which forms one and the filling substance the other electrode, separated by the dielectric layer covering the pore surfaces. Capacitors of this type are described in Columbium and Tantalum, by Sisco and Epremian at pages 566–79 (First Ed., 1963).

According to prior art techniques, the body of the capacitor may be prepared by compacting powdered metal particles, such as tantalum, sometimes admixed with an organic binder, into a porous plug. The compacting, or application of pressure, is normally followed by a pre-sinter operation in an inert atmosphere or under vacuum upwards to an hour or more until the organic binder is evaporated and a coherent body is formed having pores interconnected throughout the body. This is usually followed by a high temperature sintering in vacuum which results in a porous plug with reasonable mechanical strength, whose pores have a size depending upon the initial size of the particles, the amount of pressure applied, temperature, length of treatment time, but in general have a surface area of some 100 times or more that of a solid piece of metal having the same outside dimensions.

In those prior art techniques where the powdered metal particles are not admixed with an organic binder, the compacting force is not evenly distributed throughout the particles. The resultant plug is not of uniform density, being of greater density at the compressed ends and of less density at the middle. Accordingly, the plug is difficult to handle and frequently breaks up at the middle. Increasing of the compacting pressure results in sintered plugs that are too dense to yield excellent capacitor characteristics and furthermore, the absence of binder (which also acts as a lubricant) increases die wear in the pressing apparatus to an intolerable level. When one adds an organic binder to alleviate these problems traces of carbon from the organic binder deteriorate the capacitor characteristics.

Prior art techniques as mentioned above, for preparing porous plugs are often time consuming and expensive. Additionally, in the case where the powdered metal particles are of tantalum and the resultant plug is to be used in a capacitor the powdered metal itself represents a significant portion of cost. Thus, anything which can be done to shorten fabrication time, increase the electrical charge $Q=CV$/gram of powder and decrease the amount of powdered metal required per capacitor will be quite advantageous from a cost standpoint.

It is the object of the present invention to provide a novel method and apparatus for preparing uniformly low density, porous metal bodies, both with and without organic binders, and to provide a novel electrical device and method for producing same.

Briefly stated, in accordance with one teaching of the present invention, there is disclosed a process for preparing a porous metal body from a quantity of powdered metal particles comprising the steps of: (1) applying a moderate compacting pressure to the metal particles; and, (2) discharging a high voltage through the metal particles, effectively welding the particles together to form a porous metal body of uniformly low density. The latter step is preferably carried on in an inert atmosphere or under vacuum and while the compacting forces are still being applied to the metal particles. No binder is required, although one might be used, and hence the possibility of leaving behind impurities can be eliminated.

By the foregoing process a porous, uniformly low density body is formed having great mechanical strength in that it will retain its configuration even when subjected to reasonable handling. Formation of the body is instantaneous resulting in a considerable savings in time.

Moreover, for a porous metal body with given outside dimensions less powdered metal particles are required than with any known prior art process and there is more porous surface area after formation of the porous metal body than with any known prior art process. As a consequence of the foregoing, a considerable savings in powder, hence cost, may be achieved.

In accordance with another teaching of the present invention there is disclosed a novel apparatus for the preparation of a porous metal body from a quantity of powdered metal particles comprising: a cylindrical insulating die member adapted to receive the powdered metal particles; means for moderately compacting the powdered metal particles within the die member; and, means for passing a high voltage discharge through the powdered metal particles whereby the particles are welded together to form a porous metal body of uniformly low density. Additionally, envelope means may be included for providing an inert atmosphere surrounding the powdered metal particles.

Other objects and features of the present invention and a further understanding may be had by referring to the drawing wherein:

FIG. 1 illustrates in diagrammatic form the novel apparatus which may be used for carrying out the novel method of the present invention for preparing porous metal bodies; and, FIG. 2 is an enlarged fragmentary sectional view of an electrical device fabricated in accordance with the teachings of the present invention.

With reference to FIG. 1, metallic particles 11 are obtained by comminuting any suitable substance or alloy or mixture to a desired degree. Other finer particles may be used, either comminuted for the purpose of the invention or as otherwise available in commerce. Excellent results are obtained when using type W tantalum powder manufactured by Kawechi Chemical Corporation, Boyertown, Pa.

Thereafter, the particles 11 may be charged into the cavity 12 of a die member 13. Die member 13 is preferably made of a suitable dielectric material, for example, alumina ceramic, and which may withstand a moderate expansive force as well when the particles are compacted. Die member 13 has a cylindrical cavity 12 preferably of circular cross-section, though other cross-sections such as square or rectangular may be used as the need arises.

The means of compacting the powdered metal particles 11 in the direction indicated by the arrow A includes a top piston 14 and a bottom plate 15, as of copper. In the embodiment disclosed the bottom plate 15 is illustrated as being anchored to the base of cavity 12 although it would be within the spirit and scope of this invention to have a movable piston 15 as well. Likewise, in those applications where it is deemed desirable, the compressive force may be applied transverse to the axis of the body to be formed.

Piston 14 is connected to a rod 16. The rod 16 is hermetically sealed, and in an electrically insulated fashion as well for a conductive rod, through an envelope 17, for example, stainless steel, and is adapted to be moved up and down by a conventional advancing and retracting mechanism 18 so as to compact the metallic particles 11.

A high voltage source 19 is connected by leads L1 and L2 and through a normally open switch or electronic device 20 across a high voltage capacitor 21. Capacitor 21 is connected by leads L3 and L4 and through a normally open switch or electronic device 22 to the piston 14 and plate 15 across metallic particles 11. The leads L3 and L4 are fed through envelope 17 in vacuum tight fashion, and in insulated fashion as well, by means of high voltage feedthrough, for example.

In those situations where it is deemed preferable, envelope 17 may be evacuated through a valveable passage 23 and by means of a vacuum pump 24, for example, an ion pump of the type disclosed in U.S. Patent 2,993,638, issued July 25, 1961, prepumped by a refrigerated sorption pump. Thereafter, if desired, envelope 17 may be refilled to a desired pressure level with an inert gas such as argon, through a valveable passage 25, leading to a source of inert gas 26.

A typical operating cycle will now be described. With cavity 12 charged with the metallic particles 11, top piston 14 is lowered to thereby apply a force to the particles 11 on the order of 18,000 p.s.i. Envelope 17 may have been previously evacuated by means of vacuum pump 24 through valveable passage 23, now valved off from the envelope 17. In addition, the envelope 17 may subsequently be back-filled or flushed to a pressure up to one atmosphere or more with an inert gas, for example, argon, from the inert gas supply 26 through the valveable passage 25, now valved off from envelope 17.

Switch 20 is then closed until high voltage (typically 30,000 volts) capacitor 21 is fully charged. Then with switch 20 open and with the force still applied to the particles 11 capacitor 21 is discharged by closing switch 22 through the particles 11. The discharge effectively welds the particles together to form a porous metal body of uniformly low density.

It is to be noted that in the foregoing process, no binder was needed, and yet a porous body of uniformly low density and great mechanical strength resulted.

Alternatively, where high purity considerations are not a factor, a binder may be used and an even less dense body will result.

The invention embraces the utilization of the above described method and bodies so formed in the fabrication of tantalum capacitors. After preparation of a porous tantalum body, as described above, in accordance with well-known prior art techniques the body is sintered, typically for 30 minutes at 2100° C. under vacuum or in an inert atmosphere. The walls of the pores are then electrochemically formed, that is, by electrolytic oxidation (anodizing the tantalum body). After formation, the body is sealed into a small can with a liquid electrolyte needed for operating the capacitor. Or, in the case of a solid tantalum capacitor (see FIG. 2), a solid material replaces the operational electrolyte, typically manganese dioxide ($MnO_2$). The body is then coated with a conductive coating of colloidal carbon and enclosed in a small can, which along with the carbon provides the cathode of the capacitor, the body forming the anode of the capacitor. (An anode lead wire may either by spot-welded to the body of the capacitor after it has been prepared, but before electrochemically forming, or initially embedded in the metallic particles before preparation in which case piston 14 should be provided with a narrow, centrally position passage adapted to accommodate the lead wire.)

Solid tantalum capacitors fabricated in accordance with the foregoing method have displayed a 50% gain in CV/gram (on the order of 2300 CV/gram) over those fabricated in accordance with prior art methods thereby reducing the amount, hence cost, of powder per capacitor. Moreover, such capacitors have exhibited a low dissipation factor, on the order of 1.9–2.2% and a very low equivalent series resistance, on the order of 0.77–1.0 ohm. In addition, their low impedance at high frequencies makes them desirable for high speed computer applications.

Since many changes can be made in the above construction and many apparently widely different embodiments of this invention could be made without departing from the scope thereof, it is intended that all matter contained in the above description or shown in the accompanying drawing shall be interpreted as illustrative and not in a limiting sense.

What is claimed is:
1. The method of preparing a porous, uniformly low density body from a quantity of small metal particles comprising the steps of (1) applying a compacting pressure to said metal particles; (2) discharging a high voltage through the metal particles while said pressure is being applied effectively welding the particles together to form a porous metal body of uniformly low density; and (3) sintering said body in a furnace to improve the mechanical strength thereof without substantially further increasing said density.

2. The method of fabricating tantalum capacitors from small tantalum particles comprising: (1) applying a compacting pressure to said tantalum particles; (2) discharging in an inert atmosphere a high voltage through said tantalum particles so compacted, effectively welding the particles together to form a porous tantalum body of uniformly low density; (3) sintering said body in an inert atmosphere; (4) forming an adherent tantalum oxide layer upon said tantalum body; (5) forming a manganese dioxide coating on the surface of said tantalum oxide layer; (6) coating said manganese dioxide coating with a conductive coating of colloidal carbon; and, (7) enclosing said body in a conductive metallic can.

References Cited

UNITED STATES PATENTS

| | | | |
|---|---|---|---|
| 2,195,297 | 3/1940 | Engle | 219—149 X |
| 2,299,228 | 10/1942 | Gray et al. | 29—570 X |

(Other references on following page)

| | | | |
|---|---|---|---|
| 2,355,954 | 8/1944 | Cremer | 219—149 X |
| 2,604,517 | 7/1952 | Brennan | 29—570 X |
| 2,616,953 | 10/1952 | Booe | 29—570 X |
| 3,144,328 | 8/1964 | Doty | 75—200 |
| 3,140,944 | 7/1964 | France et al. | 75—200 |
| 3,241,956 | 3/1966 | Inove | 219—149 X |
| 3,250,892 | 5/1966 | Inove | 219—149 |
| 3,317,705 | 5/1967 | Inove | 219—149 |
| 3,320,059 | 5/1967 | Labounsky | 75—200 X |
| 2,789,901 | 4/1957 | Shipe et al. | 75—221 X |
| 3,293,006 | 12/1966 | Bartz | 75—200 X |

RICHARD M. WOOD, *Primary Examiner.*

B. A. STEIN, *Assistant Examiner.*

U.S. Cl. X.R.

75—214